United States Patent [19]

Zeidler et al.

[11] 4,318,588
[45] Mar. 9, 1982

[54] OPTICAL COMMUNICATION CABLE HAVING A REINFORCED CASING

[75] Inventors: Guenter Zeidler, Unterpfaffenhofen; Ulrich Oestreich; Gernot Schoeber, both of Munich, all of Fed. Rep. of Germany

[73] Assignee: Siemens Aktiengesellschaft, Berlin & Munich, Fed. Rep. of Germany

[21] Appl. No.: 46,696

[22] Filed: Jun. 8, 1979

[30] Foreign Application Priority Data

Jun. 13, 1978 [DE] Fed. Rep. of Germany ....... 2825845

[51] Int. Cl.³ .............................................. G02B 5/16
[52] U.S. Cl. ................................................. 350/96.23
[58] Field of Search ................... 350/96.23; 174/70 R

[56] References Cited

U.S. PATENT DOCUMENTS

| | | | |
|---|---|---|---|
| 4,076,382 | 2/1978 | Oestreich | 350/96.23 |
| 4,141,623 | 2/1979 | Dubost | 350/96.23 |
| 4,147,406 | 4/1979 | Anderson | 350/96.23 |

FOREIGN PATENT DOCUMENTS

| | | |
|---|---|---|
| 2204367 | 8/1973 | Fed. Rep. of Germany . |
| 1510123 | 7/1975 | Fed. Rep. of Germany . |
| 2522849 | 2/1976 | Fed. Rep. of Germany . |
| 2727315 | 10/1976 | Fed. Rep. of Germany . |
| 1483402 | 10/1976 | United Kingdom . |
| 1462160 | 1/1977 | United Kingdom . |
| 1483845 | 8/1977 | United Kingdom . |
| 1501800 | 2/1978 | United Kingdom . |

*Primary Examiner*—John K. Corbin
*Assistant Examiner*—Rodney Bovernick
*Attorney, Agent, or Firm*—Hill, Van Santen, Steadman, Chiara & Simpson

[57] ABSTRACT

An optical communication cable is comprised of one or more optical transmission elements loosely positioned within a double-layer synthetic material wrapping. A spun covering composed of elongated (50 to 200 mm) intertwined or unintertwined fibers at least partial coated with an adhesive is positioned about the wrapping. A relatively soft outer casing composed of a synthetic material having a modulus of elasticity smaller than 500 N/mm² is bonded onto the spun covering via the adhesive layer. Such cable construction provides improved flexibility and mechanical stability.

10 Claims, 1 Drawing Figure

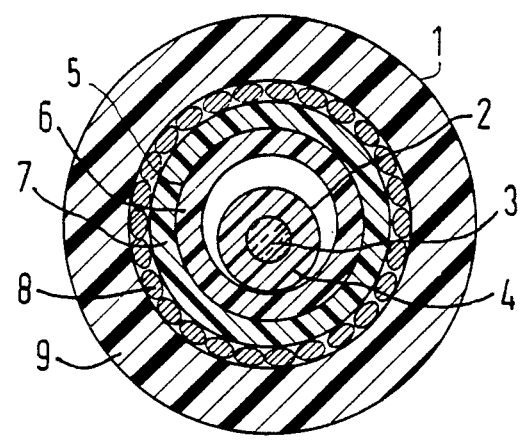

OPTICAL COMMUNICATION CABLE HAVING A REINFORCED CASING

BACKGROUND OF THE INVENTION

1. Field of the Invention

The invention relates to optical communication cables and somewhat more particularly to optical communication cables having reinforced casings.

2. Prior Art

The art is aware that optical transmission elements of optical communication cables must be protected against most various types of mechanical stresses. Such protection is usually provided by a suitable structural design of the cable core and/or the cable casing, among other elements.

Thus, for example, tension-proof elements are embedded in synthetic casings of cables. Such tension-proof elements, which for example, are composed of steel, glass, synthetic materials, graphite, etc., function to protect the cable core against excessive longitudinal stresses which may be caused by tensile force or temperature changes (cf. in this regard German Offenlegungsschrift, hereinafter DT-OS, 2,727,315; British Patent Specifications No. 1,462,160; 1,483,845 and 1,501,800).

Embedding tension-proof elements in a cable casing during its extrusion is expensive from a production technology point of view. Casing structures in which coverings or interlacings of tension-proof elements are arranged between two layers of a synthetic casing or on the inside of such a casing are, on the other hand, easier to produce (cf. in this regard British Patent Specification No. 1,453,402; U.S. Pat. No. 4,076,382 and German Auslegeschrift No. 2,628,069).

From tension-proof designs of electrical cable structures having synthetic material casings, it is known to unite tension-proof elements into a tape-like structure and to apply this tape longitudinally or in large lengths of lay onto the cable core. Such tape is then bonded or welded to the casing structure (cf. in this regard DT-OS Nos. 2,522,849; 2,204,367; 2,259,703 and German Pat. No. 1,510,123). With this type of construction as well as with the construction of the reinforced optical cable structures mentioned earlier, one must accept the fact that the cable as a whole is relatively stiff (i.e., inflexible) because of the material interlacing or bonding connection between the tension-proof elements and the synthetic casings.

Suggestions have been made that in order to overcome this difficulty in electric cables, that the tape formed of tension-proof elements be connected with the synthetic casing only at intervals of approximately one length of lay. This type of construction provides a certain degree of mobility to the tension-proof elements and improves the flexibility of the resultant cable structure.

SUMMARY OF THE INVENTION

The invention provides an improved optical communication cable structure wherein the optical transmission elements are protected against longitudinal contractions of the cable casing, such as might occur due to ambient temperature fluctuations. Optical communication cable structures produced in accordance with the principles of the invention exhibit improved mechanical support and have improved overall flexibility relative to prior art cable structures.

In accordance with the principles of the invention, an optical communication cable is comprised of a cable core containing one or more optical transmission elements surrounded by a synthetic material casing which is reinforced against longitudinal and transverse forces by a spun covering. In preferred embodiments, the synthetic material forming the casing, such as polyvinyl chloride, polyurethane, silicone rubber and the like, has a modulus of elasticity smaller than about 500 N/mm$^2$ (Newtons per square millimeter) and the spun covering is comprised of endless intertwined or elongated unintertwined fibers, each having a length of lay of about 50 to 200 mm, and which are at least partially coated with an adhesive. Such fibers are formed into a spun covering having a substantial length of lay of about 50 to 200 mm and which covering is at least partially bonded at its outer surface with the casing. The fibers, which may be twisted in the spun covering, are composed of a material selected from the group consisting of glass fibers, graphite fibers, steel strands, boron fibers, mixtures thereof and other like tension-proof fibers or strands. In certain preferred embodiments of the invention, the spun covering is composed of two plies, wherein a first ply is composed of an aramide yarn and a second ply is composed of glass yarn applied in a counter-direction to the first ply.

BRIEF DESCRIPTION OF THE DRAWINGS

The FIGURE comprises an elevated cross-sectional view of an exemplary embodiment of an optical communication cable constructed in accordance with the principles of the invention.

DESCRIPTION OF THE PREFERRED EMBODIMENT

The invention provides optical communication cables having reinforced casing so that the optical transmission elements therein are protected from transverse and longitudinal forces and the cable remains relatively flexible.

In optical communication cable constructed in accordance with the principles of the invention, the relatively soft material of the casing limits contraction forces arising due to temperature fluctuations and improves the overall flexibility of such cable. The use of a spun covering having a relatively great length of lay in such cable construction provides a means of effective transmission of longitudinal forces from the casing onto the spun covering. This transmission of forces is also aided by the at least partial adhesive bonding of the spun covering with the casing. By employing twisted fibers of substantial length or untwisted fibers having a length of about 20 to 200 mm to form the spun covering, a structure is attained wherein only the outer fiber surfaces of the spun covering are connected or bonded with the casing. In this manner, the individual fibers of the spun covering, attached only on one side thereof to the casing, have a certain degree of mobility which further favors the flexibility of the overall cable. By using spun elements consisting of endless intertwined fibers or yarns of a finite length, an individual fiber is connected or anchored to the casing only on one side and only periodically; the free length of such fiber can then execute the sliding motion required for at least a degree of flexibility. By using untwisted spun elements, the periodic anchoring of the fiber and the required sliding motion is achieved in that the individual fibers are not endless but are rather cut-off in lengths of approximately 20 to 200 mm.

The surface bonding of the spun covering with the synthetic casing takes place via the adhesive coating on the fibers of the spun covering and can be activated after the application of the synthetic casing via a previous heat treatment of the spun covering. It is preferable to apply the synthetic casing about the spun covering via a pressure injection process in order to attain adequate pressure for satisfactory bonding. The casing is preferrably a synthetic material and is preferrable selected from the group consisting of polyvinyl chloride, polyurethane, elastomer-like materials such as silicone rubber and the like, and thermoplastic elastomers.

The individual spun elements of the spun covering are composed of a material selected from the group consisting of glass fibers, graphite fibers, steel strands, boron fibers mixtures thereof and other like tension-proof fibers or strands. Preferably, the spun cover is composed of intertwined endless spun yarns. The spun covering itself can be a single ply, a bi-ply or a multi-ply structure. In spun coverings made of more than one ply, it is preferable to have alternate plies extend in counter-directions from each other. Further in multi-ply spun coverings, each ply can be composed of a different material. In a particularly preferred exemplary bi-ply spun covering structure, an inner ply is formed of an aramide yarn (such as commercially available under the trade name "Kevlar") and an outer ply is formed of glass yarn applied in a counter-direction to that of the inner ply. This type of construction improves the transverse strength and the shear strength of the spun covering.

Referring now to the drawing, an exemplary embodiment of an optical communication cable 1 is illustrated. Such cable contains, as an optical transmission element at least a single optical lead 2 consisting of a glass fiber 3 and a hard, elastic casing 4, for example composed of polyethylene terephthalate. The optical lead 2 is loosely positioned within a double-layered buffer tube 5, which consists of an inner layer 6, for example composed of a copolymer consisting of ethylene and chlorine trifluoroethylene and an outer layer 7, for example comprised of polyethylene terephthalate. A spun covering 8 is positioned over such outer layer 7 and may, for example, consist of endless intertwined spun glass fibers yarns. The individual fibers of this spun covering preferrable have a length of lay of 100 mm and are coated with an adhesive material applied as a dressing. Such adhesive material is, preferable, selected from the group consisting of silane, cellulose acetate methylene cellulose and copolymers, such as comprised of ethylene or butylene. In addition, the adhesive may be based on polyurethane resins or polyamide resins and mixtures of all of such materials.

The actual cable casing 9 consists of a relatively soft synthetic material, such as a thermoplastic polyurethane rubber, and is positioned over the spun covering so as to enter into at least a partial anchoring or bonding with the spun covering, particularly the fibers thereof lying on the outside surface thereof.

Cable casings produced in accordance with the principles of the invention are particularly useful for optical communication cables which have cable cores void of any further support elements for the absorption of longitudinal contraction forces. Such optical communication cable typically have a cable core containing only a few optical transmission elements, generally ranging from one to four optical leads.

The foregoing is considered as illustrative only to the principles of the invention. Further, since numerous modifications and changes will readily occurred to those skilled in the art, it is not desired to limit the invention to the exact construction and operation shown and described, and accordingly, all suitable modifications and equivalence may be resorted to, falling within the scope of the invention as claimed.

We claim as our invention:

1. In an optical communication cable having at least one optical transmission element surrounded by a reinforced casing, the improvement comprising wherein:
    said optical transmission element comprises an optical fiber having a relatively hard envelope tightly surrounding such fiber,
    said casing is relatively loosely positioned about said optical transmission element and comprises a multi-layered structure having an outer layer composed of a synthetic material having a modulus of elasticity smaller than about 500 N/mm$^2$ and having at least one inner layer in contact with said outer layer, with an inner layer in direct contact with said outer layer being composed of a spun covering comprised of elongated spun elements which are only partially coated with an adhesive, said spun covering having a length of lay extending from about 20 through 200 mm and being only partially bonded periodically at an outer surface thereof with said outer layer, and
    said inner layer being positioned in a buffer tube consisting of an inner layer and an outer layer.

2. In an optical communication cable as defined in claim 1 wherein said outer layer synthetic material is selected from the group consisting of polyvinyl chloride, polyurethane and silicone rubber.

3. In an optical communication cable as defined in claim 1 wherein said spun covering is composed of a first spun ply consisting of aramide yarn and a second spun ply consisting of glass fiber yarn, said second ply being applied in a counter-direction to said first ply.

4. In an optical communication cable as defined in claim 1 wherein said spun covering is composed of twisted glass yarn.

5. In an optical communication cable as defined in claim 1 wherein said elongated spun elements comprise intertwined endless fibers selected from the group consisting of glass fibers, graphite fibers, steel strands, boron fibers and mixtures thereof.

6. In an optical communication cable as defined in claim 1 wherein said elongated spun elements comprise unintertwined fibers, each having a length of about 20 through 200 mm and being selected from the group consisting of glass fibers, graphite fibers, steel strands, boron fibers and mixtures thereof.

7. An optical communication cable comprising:
    at least one optical transmission element;
    a double-layer synthetic material buffer tube relatively loosely positioned about said transmission element;
    a spun covering comprised of intertwined glass fiber yarn, each fiber yarn having a length of lay of about 100 mm and being coated with an adhesive, said spun covering being positioned about said tube; and
    a relatively soft outer casing composed of thermoplastic polyurethane rubber and having a modulus of elasticity smaller than about 500 N/mm$^2$, said outer casing being only partially bonded periodically with outer fiber surfaces of said spun covering.

8. An optical communication cable as defined in claim 7 wherein said adhesive is a material selected from the group consisting of silane, cellulose acetate, ethylene copolymer, butylene copolymer, polyurethane resin, polyamide resin and mixtures thereof.

9. An optical communication cable as defined in claim 7 wherein said cable includes one to four optical transmission elements.

10. An optical communication cable as defined in claim 7 wherein said double-layer synthetic material wrapping consists of an inner layer of an ethylene and chlorine trifluoroethylene copolymer and an outer layer consisting of polyethylene terephthalate.

* * * * *